United States Patent
Mangoyan et al.

(10) Patent No.: US 12,050,064 B2
(45) Date of Patent: Jul. 30, 2024

(54) RADIALLY-FLOWING CROSS FLOW HEAT EXCHANGER THAT INCREASES PRIMARY HEAT TRANSFER SURFACE

(71) Applicant: Hamilton Sundstrand Corporation, Charlotte, NC (US)

(72) Inventors: Raffi Mangoyan, Manchester, CT (US); Ousmane Gaye, Hartford, CT (US); Jason A. Ryon, Carlisle, IA (US); David Saltzman, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/859,283

(22) Filed: Jul. 7, 2022

(65) Prior Publication Data
US 2024/0011712 A1    Jan. 11, 2024

(51) Int. Cl.
F28D 7/00 (2006.01)
F28F 1/00 (2006.01)
F28F 9/02 (2006.01)

(52) U.S. Cl.
CPC ............ F28D 7/0058 (2013.01); F28F 1/006 (2013.01); F28F 9/02 (2013.01); *F28F 2250/106* (2013.01)

(58) Field of Classification Search
CPC . F28D 7/0058; F28F 1/006; F28F 9/02; F28F 2250/106
See application file for complete search history.

(56) References Cited

U.S. PATENT DOCUMENTS

| | | | | | |
|---|---|---|---|---|---|
| 1,400,179 | A | * | 12/1921 | Pfeiffer | F28D 7/103 220/567.3 |
| 1,871,322 | A | * | 8/1932 | Hodgins | F28D 21/0007 165/139 |
| 3,474,513 | A | * | 10/1969 | Allingham | F28D 7/106 72/379.6 |
| 3,818,984 | A | * | 6/1974 | Nakamura | F28F 3/025 165/157 |

(Continued)

FOREIGN PATENT DOCUMENTS

| | | |
|---|---|---|
| CN | 106767040 A | 5/2017 |
| RU | 2744394 C1 | 3/2021 |
| WO | 2017191418 A1 | 11/2017 |

OTHER PUBLICATIONS

European Search Report issued in European Application No. 23183714.7 dated Nov. 24, 2023; 7 pages.

*Primary Examiner* — Raheena R Malik
(74) *Attorney, Agent, or Firm* — CANTOR COLBURN LLP

(57) ABSTRACT

The present disclosure provides for heat exchanger assemblies, systems and methods. More particularly, the present disclosure provides for radially-flowing cross flow heat exchanger assemblies and systems that increase primary heat transfer surface, and related methods of use. The present disclosure provides for a cross-flow heat exchanger assembly that can be packaged cylindrically or the like (or other self-enclosed shapes), and where the heat exchanger assembly also increases and/or maximizes primary heat transfer surface area by utilizing a weave-style or interwoven heat exchanger core. A first circuit flow path can be axial or circumferential in nature, and a second circuit flow path can be radial.

11 Claims, 5 Drawing Sheets

(56) References Cited

U.S. PATENT DOCUMENTS

| | | | | |
|---|---|---|---|---|
| 4,852,368 | A * | 8/1989 | Bravo | F25B 39/02 |
| | | | | 62/515 |
| 5,878,590 | A * | 3/1999 | Kadle | F24F 3/1423 |
| | | | | 62/271 |
| 5,882,461 | A * | 3/1999 | Rogut | B01D 63/02 |
| | | | | 156/182 |
| 6,386,275 | B1 * | 5/2002 | Kuo | H01L 23/3672 |
| | | | | 174/16.3 |
| 6,631,757 | B2 | 10/2003 | Herzog et al. | |
| 6,730,274 | B1 * | 5/2004 | Ideguchi | F01N 3/2046 |
| | | | | 422/177 |
| 6,945,197 | B2 * | 9/2005 | Ryoo | F23L 5/02 |
| | | | | 122/15.1 |
| 7,013,963 | B2 * | 3/2006 | Laine | F28F 3/046 |
| | | | | 165/157 |
| 9,513,059 | B2 * | 12/2016 | Maurer | F28D 7/0058 |
| 10,406,601 | B2 * | 9/2019 | Martin | F28F 3/12 |
| 10,422,586 | B2 | 9/2019 | Ribarov et al. | |
| 10,495,384 | B2 | 12/2019 | Rock, Jr. et al. | |
| 11,293,703 | B2 * | 4/2022 | Meczkowski | F28D 7/106 |
| 11,441,846 | B2 * | 9/2022 | Nett | B21D 53/08 |
| 2021/0231379 | A1 | 7/2021 | Horoszczak et al. | |
| 2021/0270534 | A1 | 9/2021 | Erno et al. | |
| 2023/0160640 | A1 * | 5/2023 | Ryon | F28D 7/103 |
| | | | | 165/76 |

* cited by examiner

RADIALLY-FLOWING CROSS FLOW HEAT EXCHANGER THAT INCREASES PRIMARY HEAT TRANSFER SURFACE

TECHNICAL FIELD

The present disclosure relates to heat exchanger assemblies, systems and methods and, more particularly, to radially-flowing cross flow heat exchanger assemblies and systems that increase primary heat transfer surface, and related methods of use.

BACKGROUND

In general, heat exchangers are devices for transferring heat from one fluid to another. Heat is typically transferred without mixing of the fluids, which can be separated by a solid wall or other divider. Heat exchangers can be used in various applications (e.g., aerospace, refrigeration, air conditioning, space heating, electricity generation or chemical processing applications, etc.).

It is noted that heat exchangers can be subject to physically-induced stress from external forces. For example, in some applications such as transportation (e.g., aerospace, automotive) or industrial applications, a heat exchanger can be subject to stress from vibration, g-forces, or impact. Additionally, heat exchangers can be subject to thermal stress. Furthermore, it is noted that some conventional plate-fin heat exchangers transfer heat mainly through secondary surfaces (e.g., the fins).

BRIEF DESCRIPTION

The present disclosure provides for heat exchanger assemblies, systems and methods. More particularly, the present disclosure provides for radially-flowing cross flow heat exchanger assemblies and systems that increase primary heat transfer surface, and related methods of use.

The present disclosure provides for a heat exchanger assembly including an interwoven heat exchanger core having a first circuit flow path that includes a plurality of first flow paths and a second circuit flow path that includes a plurality of second flow paths, the plurality of first flow paths interwoven with the plurality of second flow paths to form the interwoven heat exchanger core; an inlet and an outlet for the first circuit flow path, and an inlet and an outlet for the second circuit flow path; and wherein a first fluid is configured to enter the heat exchanger assembly via the inlet for the first circuit flow path and move through the plurality of first flow paths and move around the interwoven heat exchanger core until the first fluid reaches the outlet for the first circuit flow path; and wherein a second fluid is configured to enter the heat exchanger assembly via the inlet for the second circuit flow path and move through the plurality of second flow paths and radially through the interwoven heat exchanger core until the second fluid reaches the outlet for the second circuit flow path, with the second fluid exchanging heat with the first fluid moving around the interwoven heat exchanger core.

In addition to one or more of the features described, or as an alternative to any of the foregoing embodiments, the first circuit flow path is an axial or circumferential first circuit flow path.

In addition to one or more of the features described, or as an alternative to any of the foregoing embodiments, the interwoven heat exchanger core is a substantially cylindrical, circular or annular heat exchanger core.

In addition to one or more of the features described, or as an alternative to any of the foregoing embodiments, the inlet for the second circuit flow path is in fluid communication with an inlet header, the inlet header an open circular plenum in a center of the interwoven heat exchanger core.

In addition to one or more of the features described, or as an alternative to any of the foregoing embodiments, the outlet for the second circuit flow path is in fluid communication with an outlet header, the outlet header an annular plenum surrounding the interwoven heat exchanger core.

In addition to one or more of the features described, or as an alternative to any of the foregoing embodiments, the second fluid is configured to move through the plurality of second flow paths and radially outward through the interwoven heat exchanger core until the second fluid reaches the outlet for the second circuit flow path.

In addition to one or more of the features described, or as an alternative to any of the foregoing embodiments, the second fluid is configured to move through the plurality of second flow paths and radially inward through the interwoven heat exchanger core until the second fluid reaches the outlet for the second circuit flow path.

In addition to one or more of the features described, or as an alternative to any of the foregoing embodiments, further comprising an outer pressure vessel that surrounds at least a portion of the interwoven heat exchanger core.

In addition to one or more of the features described, or as an alternative to any of the foregoing embodiments, the first and second circuit flow paths are non-mixed circuit flow paths that exchange heat.

In addition to one or more of the features described, or as an alternative to any of the foregoing embodiments, the first and second flow paths cross each other on alternating sides to form an alternating over and under interwoven configuration of the heat exchanger core.

The present disclosure provides for a method of fabricating and operating a heat exchanger including providing an interwoven heat exchanger core having a first circuit flow path that includes a plurality of first flow paths and a second circuit flow path that includes a plurality of second flow paths, the plurality of first flow paths interwoven with the plurality of second flow paths to form the interwoven heat exchanger core; providing an inlet and an outlet for the first circuit flow path, and an inlet and an outlet for the second circuit flow path; and introducing a first fluid to the heat exchanger via the inlet for the first circuit flow path, the first fluid moving through the plurality of first flow paths and moving around the interwoven heat exchanger core until the first fluid reaches the outlet for the first circuit flow path; and introducing a second fluid to the heat exchanger via the inlet for the second circuit flow path, the second fluid moving through the plurality of second flow paths and radially through the interwoven heat exchanger core until the second fluid reaches the outlet for the second circuit flow path, with the second fluid exchanging heat with the first fluid moving around the interwoven heat exchanger core.

In addition to one or more of the features described, or as an alternative to any of the foregoing embodiments, the first circuit flow path is an axial or circumferential first circuit flow path.

In addition to one or more of the features described, or as an alternative to any of the foregoing embodiments, the interwoven heat exchanger core is a substantially cylindrical, circular or annular heat exchanger core.

In addition to one or more of the features described, or as an alternative to any of the foregoing embodiments, the inlet for the second circuit flow path is in fluid communication with an inlet header, the inlet header an open circular plenum in a center of the interwoven heat exchanger core; and the outlet for the second circuit flow path is in fluid communication with an outlet header, the outlet header an annular plenum surrounding the interwoven heat exchanger core.

In addition to one or more of the features described, or as an alternative to any of the foregoing embodiments, the second fluid moves through the plurality of second flow paths and radially outward or inward through the interwoven heat exchanger core until the second fluid reaches the outlet for the second circuit flow path.

In addition to one or more of the features described, or as an alternative to any of the foregoing embodiments, the first and second circuit flow paths are non-mixed circuit flow paths that exchange heat.

In addition to one or more of the features described, or as an alternative to any of the foregoing embodiments, the first and second flow paths cross each other on alternating sides to form an alternating over and under interwoven configuration of the heat exchanger core.

In addition to one or more of the features described, or as an alternative to any of the foregoing embodiments, wherein providing an interwoven heat exchanger core includes additively manufacturing at least a portion of the interwoven heat exchanger core.

In addition to one or more of the features described, or as an alternative to any of the foregoing embodiments, wherein overhang angles of the second flow paths of the heat exchanger core are 30 degrees or greater from a horizontal build surface.

In addition to one or more of the features described, or as an alternative to any of the foregoing embodiments, wherein overhang angles of the second flow paths at an outer diameter of the heat exchanger core are about 30 degrees from a horizontal build surface, and overhang angles of the second flow paths at an inner diameter of the heat exchanger core are about 45 degrees from the horizontal build surface.

The above described and other features are exemplified by the following figures and detailed description.

Any combination or permutation of embodiments is envisioned. Additional features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are example embodiments wherein the like elements are numbered alike.

Features and aspects of embodiments are described below with reference to the accompanying drawings, in which elements are not necessarily depicted to scale.

Figure 1:
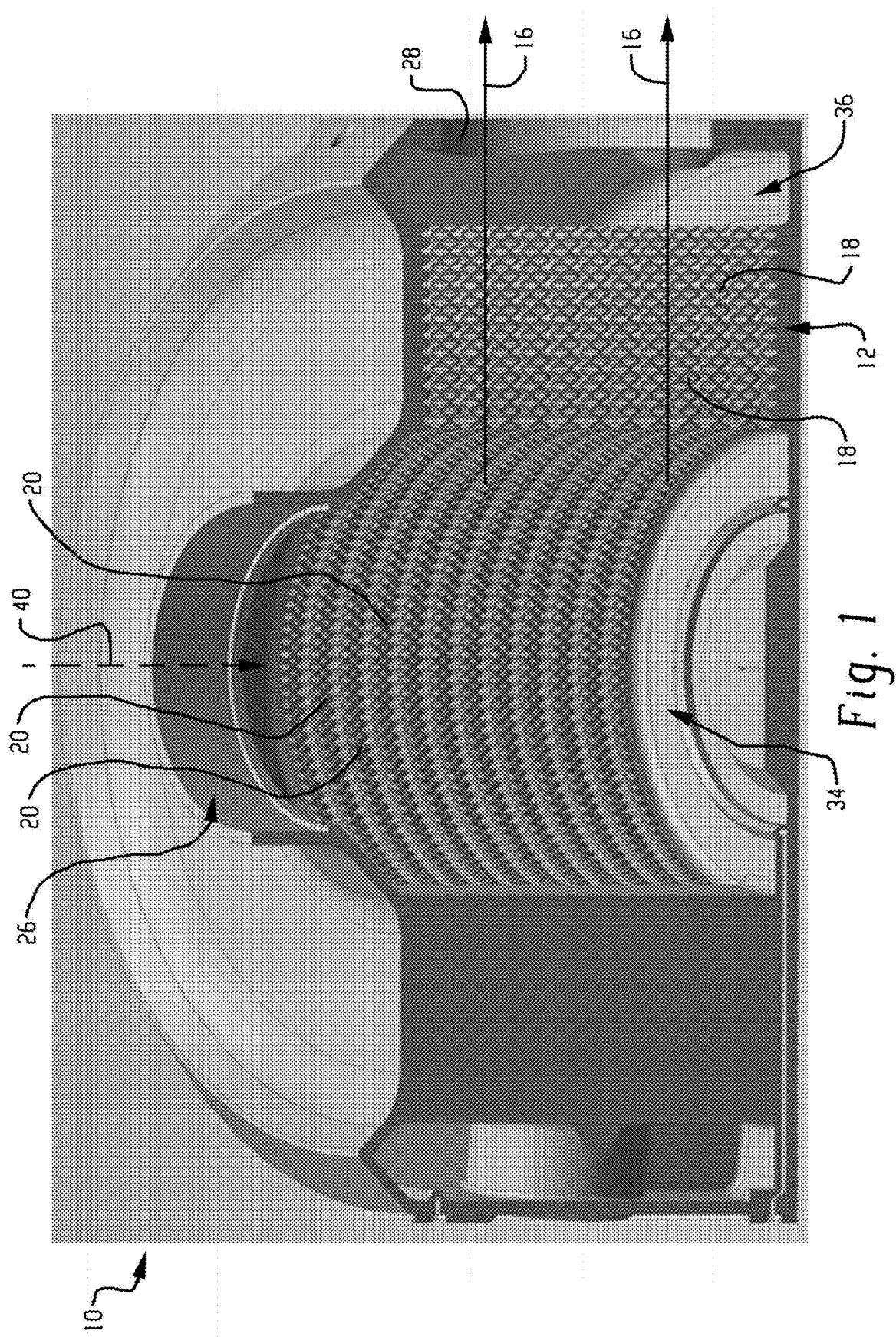
Figure 2:
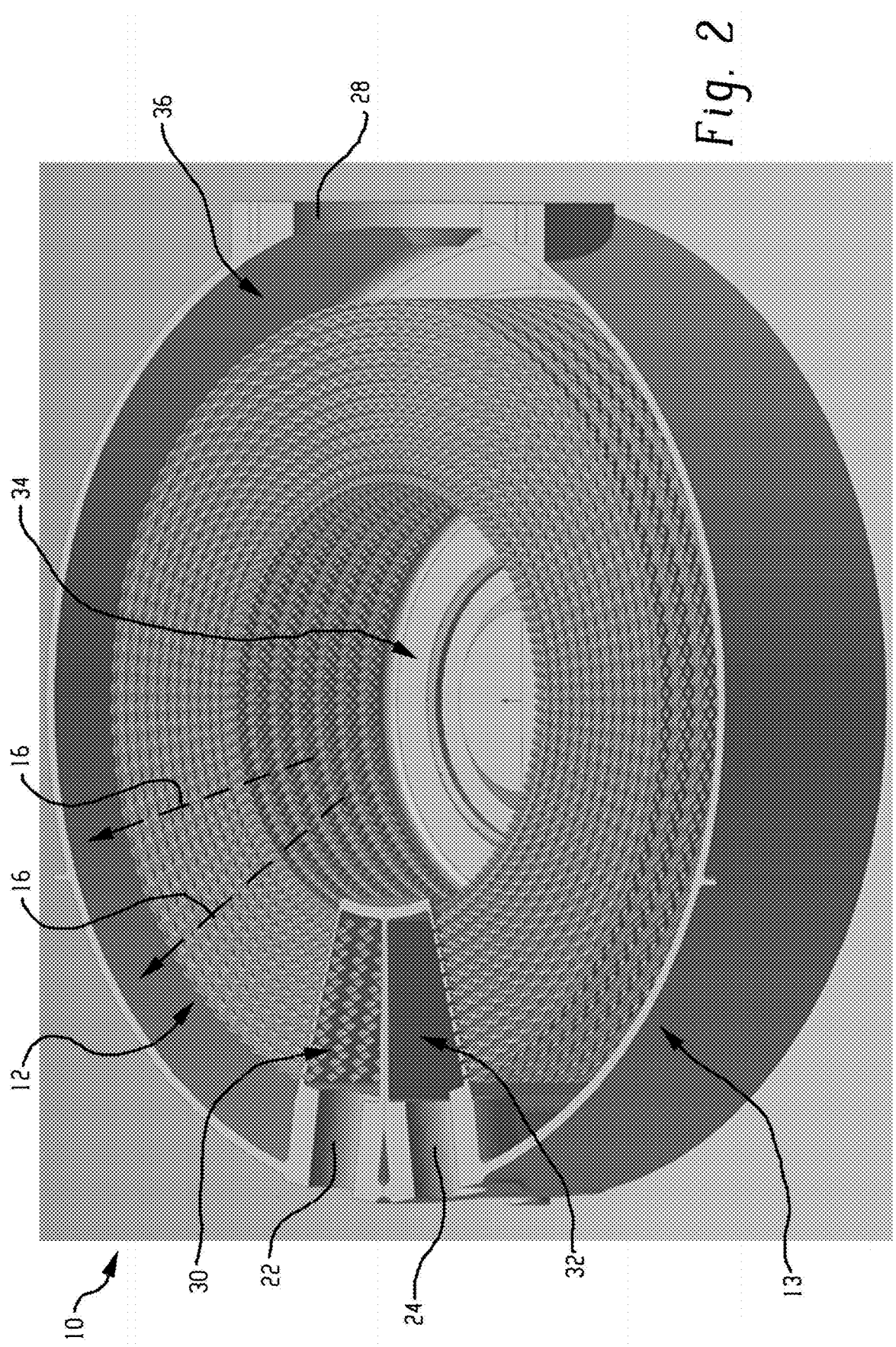
Figure 3:
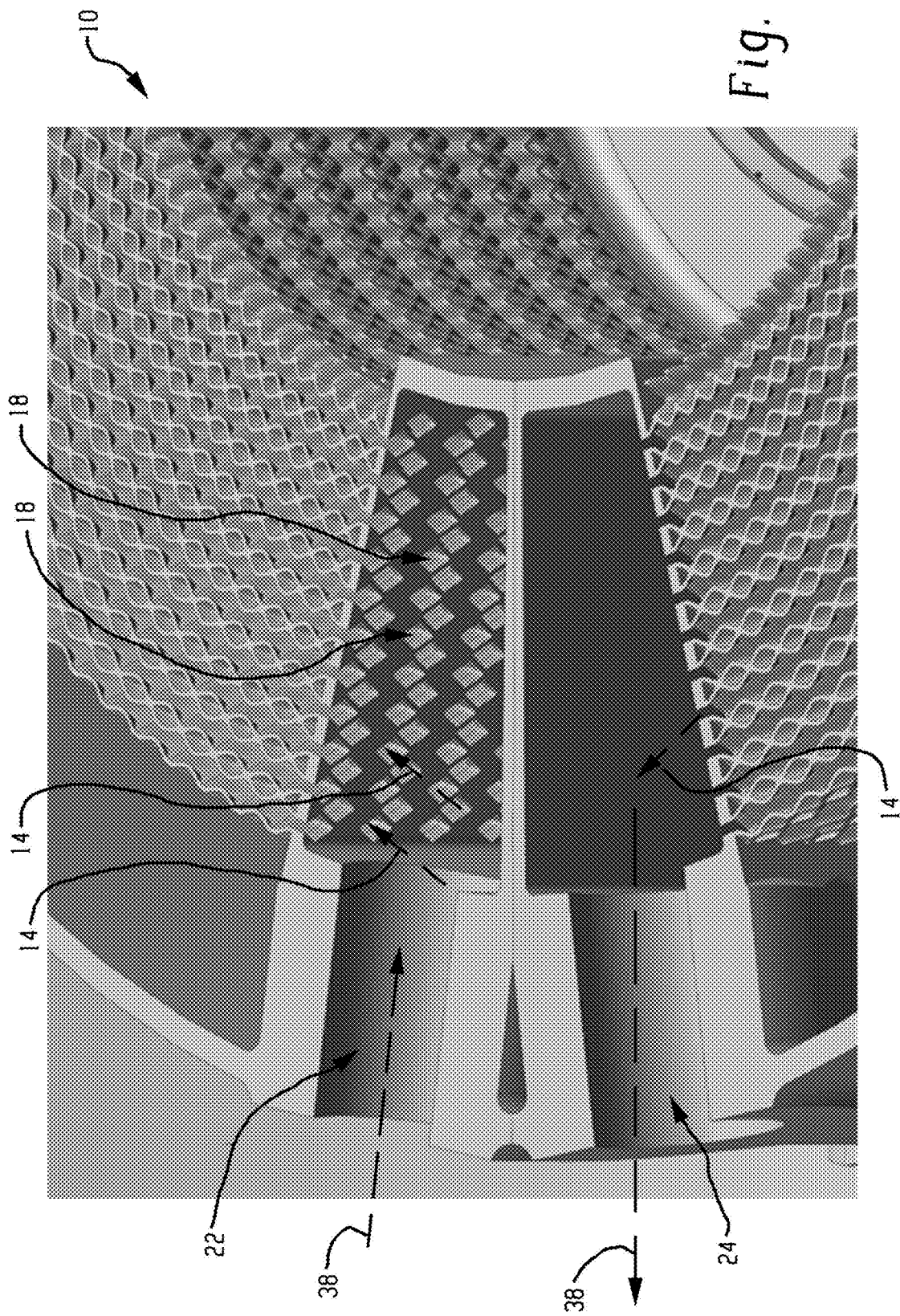
Figure 4:
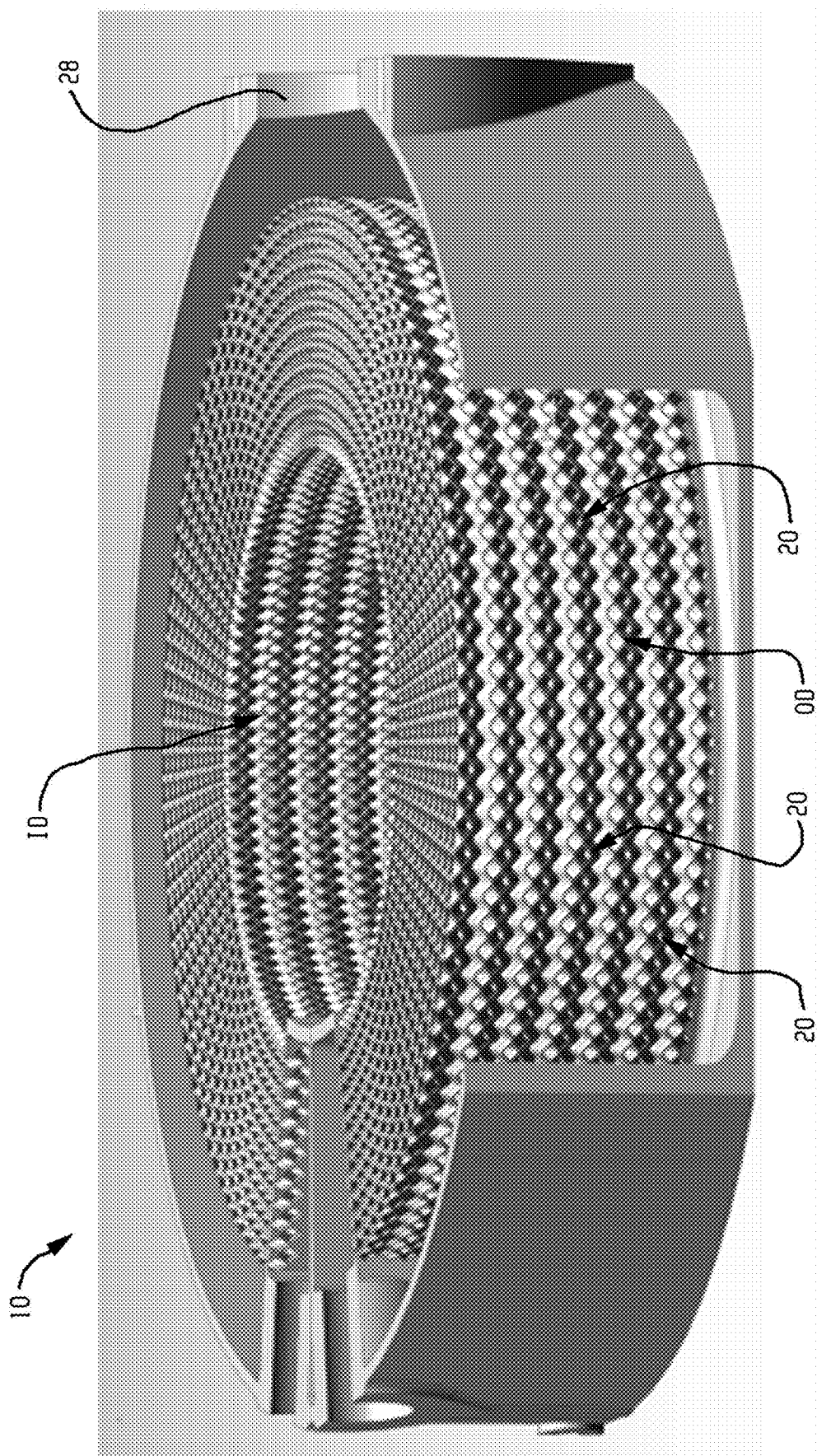
Figure 5:
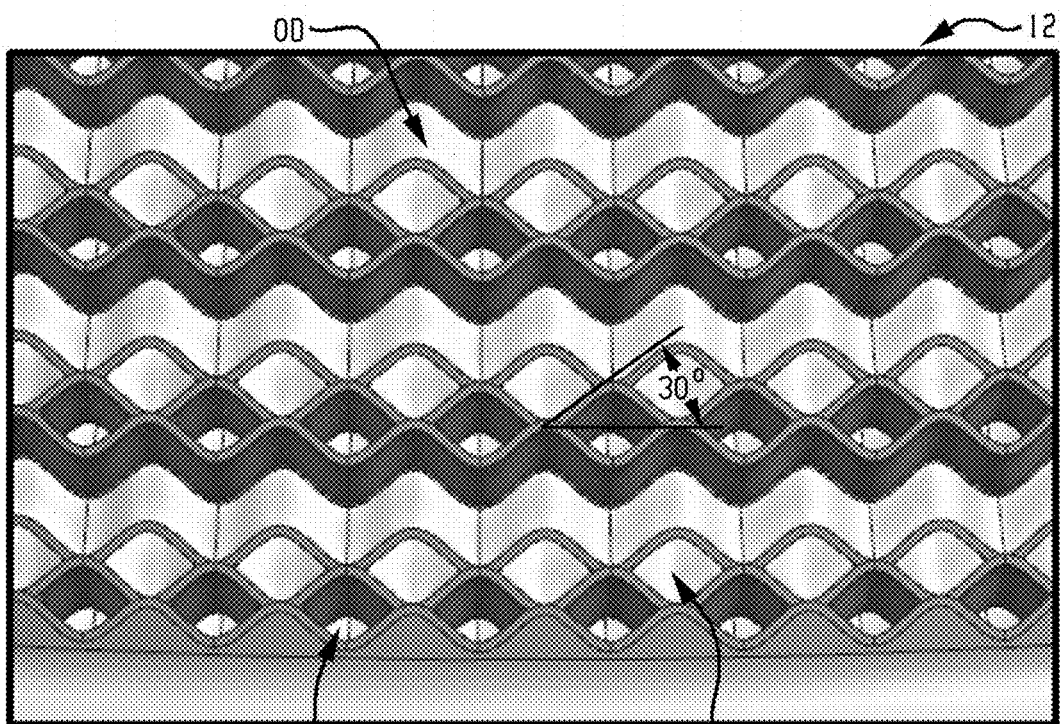
Figure 6:
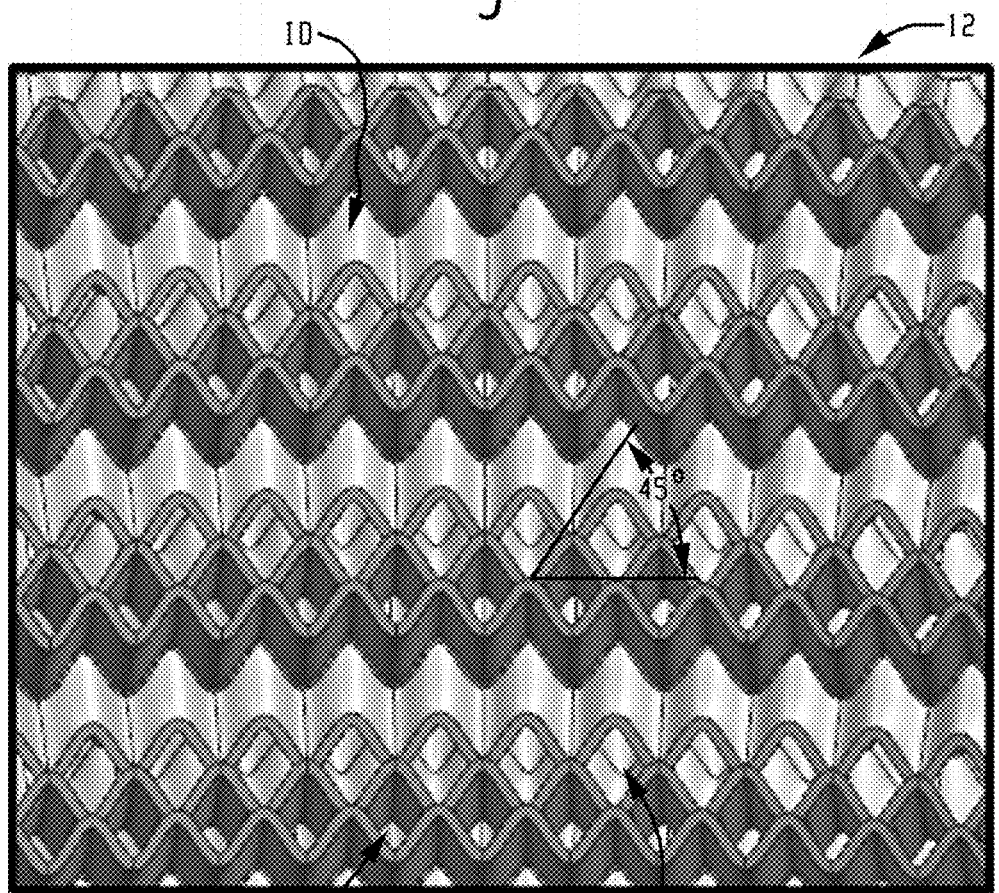

Example embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

FIG. 1 is a cross-sectional side perspective view of an example heat exchanger assembly, according to the present disclosure;

FIG. 2 is a cross-sectional top perspective view of the heat exchanger assembly of FIG. 1, according to the present disclosure;

FIG. 3 is a close-up partial view of the heat exchanger assembly of FIG. 2;

FIG. 4 is a cross-sectional side perspective view of the heat exchanger assembly of FIG. 2; and FIGS. 5 and 6 are exploded views of portions of the heat exchanger assembly of FIG. 4.

DETAILED DESCRIPTION

The example embodiments disclosed herein are illustrative of heat exchanger assemblies, and systems of the present disclosure and methods/techniques thereof. It should be understood, however, that the disclosed embodiments are merely examples of the present disclosure, which may be embodied in various forms. Therefore, details disclosed herein with reference to example heat exchanger systems and associated processes/techniques of fabrication/assembly and use are not to be interpreted as limiting, but merely as the basis for teaching one skilled in the art how to make and use the assemblies/systems and/or alternative assemblies/systems of the present disclosure.

The present disclosure provides for heat exchanger assemblies, systems and methods. More particularly, the present disclosure provides for radially-flowing cross flow heat exchanger assemblies and systems that increase primary heat transfer surface, and related methods of use.

As noted above, current practice provides that some conventional plate-fin heat exchangers transfer heat mainly through secondary surfaces (e.g., the fins), instead of through the primary surface area (e.g., the parting sheets that separate each fluid circuit). The present disclosure provides for an improved way of transferring heat by providing heat exchanger assemblies that increase and/or maximize the primary heat transfer surface area for transferring heat, as discussed further below.

There are some applications in which a cross-flow heat exchanger can be preferable over other configurations of heat exchangers (e.g., counter-flow or parallel flow). The present disclosure provides for a cross-flow heat exchanger assembly that can be packaged cylindrically or the like (or other self-enclosed shapes), and where the heat exchanger assembly also increases and/or maximizes primary heat transfer surface area by utilizing a weave-style or interwoven heat exchanger core.

It is noted that with a heat exchanger, there are at least two non-mixed flow circuits that exchange heat. In example embodiments, a first circuit flow path can be axial or circumferential in nature, and a second circuit flow path can be radial. The second circuit flow path can either start from the center of a cylinder or the like and flow to the outer diameter, or the reverse path can also be utilized.

FIG. 1 is a cross-sectional side perspective view of an example heat exchanger assembly 10, according to certain embodiments of the present disclosure (cross-section is parallel to central vertical axis of heat exchanger assembly 10).

FIG. 2 is a cross-sectional top perspective view of the heat exchanger assembly of FIG. 1 (cross-section is perpendicular to central vertical axis of heat exchanger assembly 10).

In example embodiments, heat exchanger assembly 10 takes the form of a cross-flow heat exchanger assembly 10 that can be packaged cylindrically or the like (or other self-enclosed shapes), and where the heat exchanger assembly 10 also increases and/or maximizes primary heat transfer surface area by utilizing a weave-style or interwoven heat exchanger core 12. An outer pressure vessel 13 typically surrounds at least a portion of heat exchanger core 12.

In general and as shown in FIGS. 1-3, heat exchanger assembly 10 includes at least two non-mixed flow circuits 14, 16 that exchange heat. In example embodiments, a first circuit flow path 14 can be axial or circumferential in nature, and a second circuit flow path 16 can be radial. As discussed further below, the second circuit flow path 16 can either start from the center of a cylinder or the like and flow to the outer diameter (OD), or the reverse path can also be utilized. In example embodiments, the heat exchanger core 12 takes the form of a substantially cylindrical, circular or annular heat exchanger core 12, although the present disclosure is not limited thereto.

The first circuit flow path 14 includes a plurality of first flow paths 18, and the second circuit flow path 16 includes a plurality of second flow paths 20. In example embodiments, the plurality of first flow paths 18 is interwoven with the plurality of second flow paths 20 to form a weave-style or interwoven heat exchanger core 12.

For example, at least one first flow path 18 crosses two or more second flow paths 20 on opposing sides, and that at least one second flow path 20 crosses two or more first flow paths 18 on opposing sides to form weave-style or interwoven heat exchanger core 12. In some embodiments, each first flow path 18 crosses two or more second flow paths 20 on opposing sides, and each second flow path 20 crosses two or more first flow paths 18 on opposing sides. It is noted that first and second flow paths 18, 20 can cross each other on alternating sides (e.g., sinusoidally) producing an alternating over and under crossing weave-style or interwoven configuration of heat exchanger core 12.

As shown in FIGS. 1-3, heat exchanger assembly 10 includes an inlet 22 (e.g., inlet port 22) and an outlet 24 (e.g., outlet port 24) for the first circuit flow path 14, and heat exchanger assembly 10 includes an inlet 26 (e.g., inlet duct 26) and an outlet 28 (e.g., outlet port/duct 28) for the second circuit flow path 16.

As shown in FIG. 2, the inlet 22 for the first circuit flow path 14 can be in fluid communication with an inlet header 30, and the outlet 24 for the first circuit flow path 14 can be in fluid communication with an outlet header 32.

The inlet 26 for the second circuit flow path 16 can be in fluid communication with an inlet header 34 (e.g., open circular plenum 34 in the center of heat exchanger core 12), and the outlet 28 for the second circuit flow path 16 can be in fluid communication with an outlet header 36 (e.g., annular plenum 36 surrounding heat exchanger core 12).

In use, a first fluid 38 can enter the heat exchanger assembly 10 via the inlet 22 and inlet header 30 for the first circuit flow path 14. The first fluid 38 can then travel through the plurality of first flow paths 18 and around the heat exchanger core 12 until the first fluid 38 reaches the outlet header 32 and outlet 24 for the first circuit flow path 14.

A second fluid 40 can enter the heat exchanger assembly 10 via the inlet 26 and inlet header 34 for the second circuit flow path 16. The second fluid 40 can then travel through the plurality of second flow paths 20 and radially outward through the heat exchanger core 12 until it reaches the outlet header 36 (e.g., e.g., annular plenum 36 surrounding heat exchanger core 12) and outlet 28 for the second circuit flow path 16.

As such, the second fluid 40 moving radially outward through the plurality of second flow paths 20 of the second circuit flow path 16 exchanges heat with the first fluid 38 moving axially or circumferentially through the plurality of first flow paths 18 of the first circuit flow path 14 and around the heat exchanger core 12 until the first fluid 38 reaches the outlet header 32 and outlet 24 for the first circuit flow path 14.

In other embodiments, it is noted that the second circuit flow path 16 can either start from the inner center of core 12 or the like and flow to the outer diameter OD (annular plenum 36), or the reverse path can also be utilized (e.g., flow from annular plenum 36 and through core 12 to inner center of core 12 and then up and out of assembly 10 via (outlet) duct 26).

In example embodiments, at least a portion of heat exchanger assembly 10 is additively-designed and manufactured, thereby allowing for unique geometries to be generated, with the geometries increasing and/or maximizing primary surface area for heat transfer (e.g., the plurality of first flow paths 18 is interwoven with the plurality of second flow paths 20 to form a weave-style or interwoven heat exchanger core 12 with paths 18, 20 that weave between each other).

In certain embodiments and as shown in FIGS. 4, 5 and 6, the overhang angles of the second flow paths 20 of the second circuit flow path 16 from the horizontal build surface are designed so the outer diameter OD of the heat exchanger core 12 is suitable to be fabricated with certain additive manufacturing machines. For example, overhang angles of 30 degrees or greater from the horizontal build surface can acceptable. In certain embodiments, the overhang angles of the second flow paths 20 at the outer diameter OD of the heat exchanger core 12 are about 30 degrees or greater from the horizontal build surface, and the overhang angles of the second flow paths 20 at the inner diameter (ID) of the heat exchanger core 12 are about 45 degrees or greater from the horizontal build surface. In other embodiments, it is noted that other overhang angles (e.g., 10 degrees or lower or greater; 20 degrees or lower or greater; etc.) of the second flow paths 20 of the second circuit flow path 16 from the horizontal build surface are possible (e.g., other overhang angles of the second flow paths 20 at the outer diameter OD of the heat exchanger core 12 from the horizontal build surface, and other overhang angles of the second flow paths 20 at the inner diameter (ID) of the heat exchanger core 12 from the horizontal build surface). Moreover, it is noted that with smaller second flow paths 20, the overhangs can be near horizontal. It is noted that plastic selective laser sinter and/or metal electron beam additive manufacturing may not require support material. As such, it is noted that one could print some/all surfaces horizontal.

There are many benefits of the assemblies 10 and associated systems/methods, including, without limitation: the assemblies 10 can improve heat transfer in the cross-flow heat exchanger core 12 through increasing/maximization of primary surface area; due to orientation, the assemblies can increase/maximize the frontal area of one circuit flow path, which helps to reduce pressure drop (e.g., second circuit flow path); the weave geometry of core 12 can be intentionally sized to ensure manufacturability success; a first circuit flow path can be axial or circumferential in nature and a second circuit flow path can be radial; and/or the assemblies 10 can include a fully conformal (circular) geometry.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the systems and methods of the present disclosure have been described with reference to example embodiments thereof, the present disclosure is not limited to such example embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A heat exchanger assembly comprising:
an interwoven heat exchanger core, shaped as an annulus, and having a first circuit flow path that includes a plurality of first flow paths and a second circuit flow path that includes a plurality of second flow paths, the plurality of first flow paths interwoven with the plurality of second flow paths to form the interwoven heat exchanger core, wherein the first and second circuit flow paths are each defined by surfaces with a weave-shaped geometry;
an outer pressure vessel that surrounds the interwoven heat exchanger core;
an inlet and an outlet for the first circuit flow path defined in a circumferential outer wall of the outer pressure vessel, circumferentially adjacent to each other, and
an inlet for the second circuit flow path defined in an axial center of the outer pressure vessel and an outlet for the second circuit flow path defined in the circumferential outer wall of the outer vessel, circumferentially spaced apart from the inlet and outlet for the first circuit flow path; and
wherein an inlet header and an outlet header for the first circuit flow path are defined by the interwoven heat exchanger core, are circumferentially aligned with respective ones of the inlet and outlet for the first circuit flow path so that the inlet and outlet headers for the first circuit flow path are circumferentially adjacent to each other, and
wherein inlet header and an outlet header for the first circuit flow each extend between opposite axial ends of the interwoven heat exchanger core, between outer and inner radial ends of a portion of the interwoven heat exchanger core, and wherein the inlet header for the first circuit flow extends between a first circumferential end to a circumferential center of the portion of the interwoven heat exchanger core, and the outlet header for the first circuit flow extends between the circumferential center to a second circumferential end of the portion of the interwoven heat exchanger core,
wherein a first fluid is configured to radially enter the inlet header for the first circuit flow path in the heat exchanger assembly via the inlet for the first circuit flow path and move through the plurality of first flow paths and move axially or circumferentially around the interwoven heat exchanger core until the first fluid reaches the outlet header for the first circuit flow path and radially exits the outlet header via the outlet for the first circuit flow path; and
wherein a second fluid is configured to enter the heat exchanger assembly via the inlet for the second circuit flow path and move through the plurality of second flow paths and radially through the interwoven heat exchanger core until the second fluid reaches the outlet for the second circuit flow path, with the second fluid exchanging heat with the first fluid moving around the interwoven heat exchanger core,
wherein the inlet for the second circuit flow path is in fluid communication with an inlet header, the inlet header is an open circular plenum in a center of the interwoven heat exchanger core that extends continuously between opposite axial ends of the interwoven heat exchanger core,
wherein the outlet for the second circuit flow path is in fluid communication with an outlet header for the second circuit flow path,
the outlet header for the second circuit flow path is an annular plenum surrounding the interwoven heat exchanger core, between the interwoven heat exchanger core and the circumferential wall of the outer pressure vessel, wherein the outlet header for the second circuit flow path extends continuously between the opposite axial ends of the interwoven heat exchanger core, wherein the second circuit flow path is axially into the inlet for the second circuit flow path in the axial center of pressure vessel, into the inlet header for the second circuit flow path at the open circular plenum in the center of the heat exchanger, radially into and through the interwoven heat exchanger core via the open circular plenum, into the annular plenum surrounding the interwoven heat exchanger core, and out of the outlet for the second circuit flow path in the circumferential wall of the pressure vessel, whereby at least one first flow path of the plurality of first flow paths crosses two or more second flow paths of the plurality of second flow paths on opposing sides, and at least one second flow path of the plurality of second flow paths crosses two or more first flow paths of the plurality of first flow paths on opposing sides to form the interwoven heat exchanger core.

2. The assembly of claim 1, wherein the second fluid is configured to move through the plurality of second flow paths and radially outward through the interwoven heat exchanger core until the second fluid reaches the outlet for the second circuit flow path.

3. The assembly of claim 1, wherein the first and second circuit flow paths are non-mixed circuit flow paths that exchange heat.

4. The assembly of claim 1, wherein the first and second flow paths cross each other on alternating sides to form an alternating over and under interwoven configuration of the heat exchanger core.

5. A method of fabricating and operating a heat exchanger comprising:

providing an interwoven heat exchanger core, shaped as an annulus, and having a first circuit flow path that includes a plurality of first flow paths and a second circuit flow path that includes a plurality of second flow paths, the plurality of first flow paths interwoven with the plurality of second flow paths to form the interwoven heat exchanger core, wherein the first and second circuit flow paths are each defined by surfaces with a weave-shaped geometry;

providing an outer pressure vessel that surrounds the interwoven heat exchanger core;

providing an inlet and an outlet for the first circuit flow path defined in a circumferential outer wall of the outer pressure vessel, circumferentially adjacent to each other, and an inlet for the second circuit flow path defined in an axial center of the outer pressure vessel and an outlet for the second circuit flow path defined in the circumferential outer wall of the outer vessel, circumferentially spaced apart from the inlet and outlet for the first circuit flow path; and wherein an inlet header and an outlet header for the first circuit flow path are defined by the interwoven heat exchanger core, are circumferentially aligned with respective ones of the inlet and outlet for the first circuit flow path so that the inlet and outlet headers for the first circuit flow path are circumferentially adjacent to each other, and wherein inlet header and an outlet header for the first circuit flow each extend between opposite axial ends of the interwoven heat exchanger core, between outer and inner radial ends of a portion of the interwoven heat exchanger core, and wherein the inlet header for the first circuit flow extends between a first circumferential end to a circumferential center of the portion of the interwoven heat exchanger core, and the outlet header for the first circuit flow extends between the circumferential center to a second circumferential end of the portion of the interwoven heat exchanger core, introducing a first fluid to radially enter the inlet header for the first circuit flow path in the heat exchanger via the inlet for the first circuit flow path, the first fluid moving through the plurality of first flow paths and moving axially or circumferentially around the interwoven heat exchanger core until the first fluid reaches the outlet header for the first circuit flow path and radially exit the outlet header via the outlet for the first circuit flow path; and introducing a second fluid to the heat exchanger via the inlet for the second circuit flow path, the second fluid moving through the plurality of second flow paths and radially through the interwoven heat exchanger core until the second fluid reaches the outlet for the second circuit flow path, with the second fluid exchanging heat with the first fluid moving around the interwoven heat exchanger core, wherein the inlet for the second circuit flow path is in fluid communication with an inlet header, the inlet header is an open circular plenum in a center of the interwoven heat exchanger core that extends continuously between opposite axial ends of the interwoven heat exchanger core, wherein the outlet for the second circuit flow path is in fluid communication with an outlet header for the second circuit flow path, the outlet header for the second circuit flow path is an annular plenum surrounding the interwoven heat exchanger core, between the interwoven heat exchanger core and the circumferential wall of the outer pressure vessel, wherein the outlet header for the second circuit flow path extends continuously between the opposite axial ends of the interwoven heat exchanger core, wherein the second circuit flow path is axially into the inlet for the second circuit flow path in the axial center of pressure vessel, into the inlet header for the second circuit flow path at the open circular plenum in the center of the heat exchanger, radially into and through the interwoven heat exchanger core via the open circular plenum, into the annular plenum surrounding the interwoven heat exchanger core, and out of the outlet for the second circuit flow path in the circumferential wall of the pressure vessel whereby at least one first flow path of the plurality of first flow paths crosses two or more second flow paths of the plurality of second flow paths on opposing sides, and at least one second flow path of the plurality of second flow paths crosses two or more first flow paths of the plurality of first flow paths on opposing sides to form the interwoven heat exchanger core.

6. The method of claim 5, wherein the second fluid moves through the plurality of second flow paths and radially outward or inward through the interwoven heat exchanger core until the second fluid reaches the outlet for the second circuit flow path.

7. The method of claim 5, wherein the first and second circuit flow paths are non-mixed circuit flow paths that exchange heat.

8. The method of claim 5, wherein the first and second flow paths cross each other on alternating sides to form an alternating over and under interwoven configuration of the heat exchanger core.

9. The method of claim 5, wherein providing an interwoven heat exchanger core includes additively manufacturing at least a portion of the interwoven heat exchanger core.

10. The method of claim 9, wherein overhang angles of the second flow paths of the heat exchanger core are 30 degrees or greater from a horizontal build surface.

11. The method of claim 9, wherein overhang angles of the second flow paths at an outer diameter of the heat exchanger core are about 30 degrees from a horizontal build surface, and overhang angles of the second flow paths at an inner diameter of the heat exchanger core are about 45 degrees from the horizontal build surface.

* * * * *